United States Patent Office 3,528,847
Patented Sept. 15, 1970

3,528,847
STAIN-COLORING OF GLASS-CERAMIC
MATERIALS
Peter Grego and Robert G. Howell, Corning, N.Y., assignors to Corning Glass Works, Corning, N.Y., a corporation of New York
No Drawing. Continuation-in-part of application Ser. No. 762,364, Sept. 16, 1968, which is a continuation-in-part of application Ser. No. 693,717, Dec. 27, 1967. This application Nov. 14, 1969, Ser. No. 877,054
Int. Cl. C03c 21/00
U.S. Cl. 117—124         7 Claims

ABSTRACT OF THE DISCLOSURE

This invention relates to the stain-coloring of glass-ceramic materials by an ion exchange process wherein silver, copper, gold, mercury and/or thallium ions are exchanged for lithium, sodium, and/or potassium ions and the colors produced are dependent upon the thermal history of the glass-ceramic, the ion exchange firing schedule, the composition of the staining paste, and the refiring schedule, if any.

---

This application is a continuation-in-part of our copending application, Ser. No. 762,364, now abandoned, filed Sept. 16, 1968 which, in turn, was a continuation-in-part of Ser. No. 693,717, filed Dec. 27, 1967 and now abandoned.

BACKGROUND OF THE INVENTION

Many techniques are known for coloring and/or decorating of glass materials. These techniques include glazing, staining, and diffusing coloring ions into the surface of the glass. With the invention of glass-ceramic materials, as disclosed in U.S. Pat. No. 2,920,971, new techniques for decorating and coloring had to be developed. Glaze and diffusion techniques have been developed, but in some applications these techniques do not provide the desired colors, durability, coefficient of expansion, or other properties. Stain-coloring of glass is well known but when the known techniques are applied to glass-ceramics, colored surfaces cannot be produced. Glass-ceramics are strong materials, but it is sometimes desirable to further strengthen them by chemical ion exchange. Hence, any coloring or decorating technique should not prevent or inhibit this type of strengthening.

Recently, glass-ceramic materials have been formed into sheet products which are useful as building siding. The inherent advantages of the material have been recognized by architects and designers. However, these sheets have not been able to reach their full commercial potential partly due to their lack of color. These sheets have been prepared with a glossy or matte finish in a white or blue-white color. However, it was still found to be necessary to develop a new coloring process so that these sheets would fill the needs of the market place.

SUMMARY OF THE INVENTION

We have found that glass-ceramic materials can be stain-colored and decorated by an ion exchange process wherein silver, copper, thallium, gold and/or mercury ions are exchanged for alkali metal ions in the glass-ceramic. This process allows us to produce a wide range of colors while maintaining all the desirable characteristics of the glass-ceramic material. Furthermore, we have found that we can stain-color either a glossy or matte finished glass-ceramic surface and that this stain-color will not block or deleteriously affect a subsequent chemical strengthening by ion exchange. Glass-ceramics colored, or decorated, by this technique have been found to be as durable as the base material. However, we have found that the traditional glass staining pastes cannot be used and that other staining paste compositions had to be developed. The traditional coloring ions copper, silver, thallium, gold, and mercury can be used but the staining paste, rather than containing ochre, clay, and iron oxides, must contain other wetting agents, plasticizers, and carriers in combination with zirconia ($ZrO_2$), titania ($TiO_2$) and/or alumina ($Al_2O_3$). Furthermore, the temperature at which the glass-ceramic is cerammed, or at which the crystals are nucleated and grown, the finish of the surface, and the ion exchange firing schedule will affect the colors that can be produced. Moreover, we have found that after a color has been developed, the color may be changed by refiring the body at a temperature higher than the highest prior firing temperature.

DESCRIPTION OF THE PREFERRED EMBODIMENT

The mechanism by which this stain-coloring of glass-ceramics takes place is not completely understood but it is thought to be basically different than that which takes place in glass. In glass there is a straight substitution of one metal coloring ion for one alkali metal ion and, as a result thereof, a color center will form and grow to a particular size. The size of the color center will not vary significantly as a result of pretreatment of the glass or ion exchange firing schedules. However, the mechanism in a glass-ceramic material is believed to be significantly different. Glass-ceramics are ceramic bodies consisting of interlocking microcrystals in a glassy matrix. The size of the microcrystals is related to the ceramming schedule. It is believed that there is an exchange of metal coloring ions for alkali metal ions in the glassy matrix, similar to the process in glasses. However, in addition to that exchange, it is believed that the coloring ions exchange with the alkali metal ions in the microcrystals and also that the coloring ions assume interstitial positions in the microcrystals. Hence, it can be seen that the number of coloring ions which can be exchanged with a glass-ceramic will depend to some extent upon the size of the microcrystals which is in turn related to the ceramming schedule. Furthermore, the color has also been found to be dependent upon the ion exchange firing temperature which controls the number of metal coloring ions entering the surface. Thus, the color center size and hence the color varies with the change in ceramming schedule and ion exchange firing schedule. This result is totally unexpected in view of experience with glasses wherein the intensity, and not the color, varies with changes in the ion exchange firing schedule; the lack of color change, in glasses, is believed to be related to the lack of change in color center size with change in the ion exchange firing schedule. Thus, many colors which cannot be produced in glasses can be produced in glass-ceramics.

Glass-ceramic materials containing alkali metal ions may, usually, be stain-colored by ion exchange. Generally, the commercial glass-ceramics which are to be stain-colored contain lithium, sodium and/or potassium ions. Hence, the metal coloring ions are exchanged for lithium, sodium and/or potassium ions. Surprisingly, we have found that stain-coloring will only take place after the glass has been converted to a glass-ceramic. We have not been able to stain the "green," or uncerammed, glass. As indicated above, we have found that by varying the ceramming schedule while holding all other variables constant we can obtain a variety of colors. Furthermore, we have found that glass-ceramics which have been cerammed at less than about 850° C. will not stain-color readily and hence for commercial usage are impractical; perhaps at high ion exchange temperatures for long periods of time some coloring may take place. Glass-ceramics which have been cerammed at temperatures as high as 1200° C. may be stain-colored. In certain glass-ceramic compositions, the stain-color has been found to vary with the ceramming temperature up to about 1000° C.; above 1000° C. a color was produced but there was little, if any, variation therein with changes in the ceramming temperature. Thus, it would seem that based upon the ceramming schedule there is a maximum number of metal coloring ions which can be introduced into the surface and/or the color center can grow to a maximum size. Sometimes it is desirable to produce a matte finish on the surface. This is accomplished, most conveniently, by the method disclosed is copending application, Ser. No. 613,420, "Light Diffusing Surfaces for Glass-Ceramic Articles," filed Feb. 2, 1967. This method basically involves reacting $CaCO_3$ with the surfaces of the article so as to form a light-diffusing surface thereon. We have found that articles having such a surface can be stain-colored by the same methods as described above.

The staining paste used in glass-staining could not be used with glass-ceramics. The reason has not yet been determined. Pastes containing the traditional ochre, clay, and iron oxides, have been proven to be inoperative. However, pastes containing a diluent such as titania ($TiO_2$), zirconia ($ZrO_2$), and/or alumina ($Al_2O_3$) have been found to produce colors. It is believed that those compounds aid in dispersing the metal coloring ions throughout the paste, thus providing a uniform stain. Furthermore, the diluent will react with the alkali ion which is coming out of the glass-ceramic; thus, the alkali ion is, in a sense, tied up and cannot oxidize and attack the glass surface, create a counter potential to inhibit exchange, or re-exchange with the coloring ion in the glass-ceramic surface. The amount of diluent can range, in weight percent of total dry solids, from 20 to 80%. If too little is used, the stain will be nonuniform and spotty; if too much is used, the stain will be pale, if there is any stain at all. The usual metal coloring ions of copper, silver, gold, mercury and/or thallium can be exchanged to produce the desired colors. However, for most commercial articles copper and/or silver is normally used. The copper and/or silver ions are introduced into the paste as silver sulfide ($Ag_2S$), silver sulfate ($Ag_2SO_4$), silver nitrate ($Ag_2NO_3$), copper sulfide ($CuS$), copper sulfate ($CuSO_4$) and/or cuprous chloride ($CuCl$). The paste, in addition to containing the metal coloring ion compounds and the diluents, also contains dispersants, plasticizers, and wetting agents. These plasticizers, dispersants, and wetting agents are added in such amounts as are necessary to make a uniform paste of the proper viscosity for application. Typical plasticizers include bentonite, Carbowax 20M, and/or lignosulfonate while typical wetting agents includes isobutyl alcohol, ethyl alcohol and/or water. When applied the paste should form a coating between about .0025 to .0045 inch thick. If the coating is less than .0025 inch, the stain begins to become pale; if greater than .0045 inch, the paste leaves a hard "mud-flat" type of crust on the surface. However, it should be recognized that these are preferred ranges and not specific limitations. We prefer to spray the paste onto the surface although other methods of application can be used. For example, the paste can also be applied by flow coating, dipping, and screening.

After application, the paste is dried by heating so as to remove water and any other volatile constituents before the ion exchange firing.

The paste and body are then heated to a temperature between about 500° C. and 850° C. for a sufficient length of time to affect ion exchange. We have found that little, if any, ion exchange is affected at temperatures less than 500° C. Perhaps at unreasonably long firing times ion exchange could take place. Above about 850° C., regardless of the prior ceramming schedule, only one color can be produced although the saturation of that color changes. The reason for this is yet to be understood. Assuming all other factors are held constant, various colors are produced by firing the paste and body at different ion exchange temperatures between about 500° C. and 850° C. The length of time of firing has less effect than changes in temperature on the color, but changes in time do affect the hue. Thus, by varying the ceramming schedule and ion exchange firing schedule a wide spectrum of colors and hues can be produced. The depth of the ion exchanged layer can vary from 1 to 50 microns, depending upon treatment.

In most circumstances, the reducing conditions within the glass-ceramic are sufficient to reduce the monovalent coloring ion to the metal atom. Thus, there would be no need for the subsequent conventional heat treatment to reduce the metal ion to the atom so as to produce the color. Copper, silver, gold and probably mercury do not require a subsequent reduction heat treatment. However, under some circumstances, the reducing conditions within the glass-ceramic are not sufficient and an additional reduction heat treatment is necessary. Thallium normally requires such an additional heat treatment; mercury possibly may require such a heat treatment. To insure total reduction of all the coloring ions the ion exchanged article can be given the additional subsequent reduction heat treatment. Thus, the reduction of all the gold, silver, copper, mercury and/or thallium is assured.

The securing of sufficiently reducing conditions within glass-ceramic articles to effect the reduction of the monovalent metal coloring ion to the metal atom during the ion exchange step may be secured through including in the original glass batch an ingredient that will function as a reducing agent or the atmosphere in which the glass batch is melted is made highly reducing such that certain ions present in the melt and the glass article formed therefrom are in a reduced state. Such practices have long been recognized in the glassmaking art as is evidenced by W. A. Weyl, "Coloured Glasses," Dawson's of Pall Mall, London, 1959 at such pages as 119, 130, 141, 143–147, and 406–410.

Hence, in the following examples, the presence of arsenic in the glass-ceramic composition provided sufficiently reducing conditions to effect the reduction of copper and silver ions to metallic copper and silver, respectively, whereas to insure the reduction of thallium ions to thallium atoms, a highly reducing atmosphere was employed during the ion exchange coloring step.

After ion exchange and reduction, the glass-ceramic surface is cleaned so as to reveal the stain colors. If it is desired, the stained article may next be chemically strengthened.

Our invention is further illustrated by the following examples:

Example I

A small flat sheet of "green" glass having about the following composition on a weight percent basis, $SiO_2$— 44.1, $Al_2O_3$—31.5, $Na_2O$—16.7, $TiO_2$—7.4, and $As_2O_3$—0.3 was cerammed according to the following schedule: Heat from the ambient temperature to 850° C. at a rate of 200°/hour, hold at 850° C. for 2 hours, heat to 1100° C. at a rate of 200° C./hour, hold at 1100° C. for 2 hours, and furnace cool to the ambient temperature. A staining paste was prepared by ball milling the following materials: $Ag_2S$—34.5 grams, $CuS$—6.0 grams, $TiO_2$—84.2 grams and 150 ml. of water. The viscosity of the paste was adjusted to between 5 and 10 poises for spraying. The paste was then sprayed on the glass to a thickness between .0025 and .0045 inch. The coating was then dried at 150° C. for 5 minutes. Thereafter, the coated glass-ceramic was fired at 575° C. for 30 minutes thus affecting an ion exchange. The sample was cooled and cleaned and the color was found to be pink-red about 30 microns deep.

Example II

A small flat sheet of "green" glass having about the following composition, on a weight percent basis, $SiO_2$—

38.5, $Al_2O_3$—30.2, $K_2O$—23.3, $TiO_2$—7.2 and $As_2O_3$—.8 was cerammed according to the following schedule: Heat from the ambient temperature to 700° C. at a rate of 300° C./hour and then to 1000° C. at a rate of 50° C./hour, hold at 1000° C. for 4 hours, and furnace cool to room temperature. A staining paste was prepared by ball milling the following materials: $Ag_2SO_4$—31.0 grams, CuS—12.0 grams, $Al_2O_3$—56.0 grams, bentonite—1.0 gram, 70.0 ml. isobutyl alcohol and 70.0 ml. ethylene glycol. The viscosity of the paste was adjusted to between 5 and 10 poises for spraying. The paste was then sprayed on the glass to a thickness between .0025 to .0045 inch. The coating was then dried at 150° C. for 30 minutes. Thereafter, the coated glass-ceramic was fired at 575° C. for 30 minutes thus effecting an ion exchange. The sample was cooled and cleaned and the color was found to be a red-amber approximately 30 microns deep.

Example III

A small flat sheet of "green" glass having the following composition, on a weight percent basis, $SiO_2$—64.9%, $Al_2O_3$—19.9%, $B_2O_3$—2.2%, $Na_2O$—0.4%, $K_2O$—0.2%, MgO—1.7%, CaO—0.1%, ZnO—2.5%, $Li_2O$—3.6%, $TiO_2$—4.5%, $As_2O_3$—1.0%, was cerammed at 860° C. for ½ hour. A staining paste was prepared by ball milling the following materials: $Ag_2S$—34.5 grams, CuS—6.0 grams, $TiO_2$—84.2 grams, bentonite—10.0 grams, ligno-sulfonate—0.3 gram, and 150 ml. of $H_2O$. The viscosity of the paste was adjusted to between 5 and 10 poises for spraying. The paste was then sprayed on the glass to a thickness between .0025 and .0045 inch. The coating was then dried at 150° C. for 5 minutes. Thereafter, the coated glass ceramic was fired at 575° C. for 30 minutes thus affecting an ion exchange. The sample was cooled and cleaned and the color was found to be a dark bronze approximately 30 microns deep.

Samples were prepared as in Example III except the ceramming schedule was changed and the resultant colors are as indicated in Examples IV–VII.

| Example No. | Ceramming schedule | Color |
| --- | --- | --- |
| IV | 900° C. for ½ hour | Light bronze. |
| V | 925° C. for ½ hour | Tan. |
| VI | 950° C. for ½ hour | Gray blue. |
| VII | 1,000° C. for ½ hour | Bright blue. |

Example VIII

An aqueous slurry containing 90% $CaCO_3$ and 10% $TiO_2$ was sprayed onto a sample sheet of glass having the same composition as that in Example III. The sheet and slurry were then heated at 860° C. for ½ hour. After removal of the residue, the sheet was found to be a matte finished glass-ceramic sheet. The matte finished sheet was then treated as in Example III and the resultant color was charcoal gray.

Example IX

A small flat sheet of glass-ceramic material as in Example III was coated with a staining paste of about the following composition: 34.2 grams $Ag_2SO_4$, 57.8 grams $TiO_2$, and 7.0 grams bentonite in water. The coated sheet was then treated as in Example III and the color was amber.

Example X

A small flat sheet of glass-ceramic material as in Example III was coated with a staining paste of the following composition: 34.2 grams CuCl, 57.8 grams $TiO_2$, and 7.0 grams bentonite in water. The coated sheet was then treated as in Example III and the color produced was green.

Example XI

A small flat sheet of glass-ceramic material as in Example III was coated with a staining paste of the following composition: 29.8 grams $Ti_2SO_4$, 62.4 grams $TiO_2$, and 7.8 grams bentonite in water. The sheet was then treated as in Example III and then subjected to an additional reduction heat treatment of 580° C. for 60 minutes in a 20% $H_2$-80% $N_2$ atmosphere; the color produced was charcoal gray.

Samples were again prepared as in Example III except the ion exchange firing schedule was changed and the resultant colors changed as shown in Examples XII–XVI.

| Example No. | Firing schedule | Color |
| --- | --- | --- |
| XII | 500° C. for 60 minutes | No color. |
| XIII | 600° C. for 30 minutes | Medium bronze. |
| XIV | 650° C. for 15 minutes | Dark tan. |
| XV | 700° C. for 15 minutes | Light tan. |
| XVI | 850° C. for 15 minutes | Yellow. |

Samples were prepared as in Example VII except the ion exchange firing schedule was changed and the resultant colors changed as indicated in Example XVII–XX.

| Example No. | Firing schedule | Color |
| --- | --- | --- |
| XVII | 600° C. for 30 minutes | Medium blue. |
| XVIII | 650° C. for 15 minutes | Light blue. |
| XIX | 700° C. for 15 minutes | Very light blue. |
| XX | 850° C. for 15 minutes | Pastel blue. |

Quite unexpectedly, we have discovered that after a glass-ceramic article has been stain colored according to the previously described procedures, if it is then heated to a temperature higher than the ion exchange firing temperature or the highest prior firing temperature a color change can be affected. However, this change of color upon refire can be affected only in glass-ceramic articles which have been stain-colored with a combination of copper and silver. Moreover, in order to affect the color change the refire temperature must be between 500° C. and 850° C. Below 500° C. there will be no color change and above 850° C. there will be little, if any, color change although there may be a change in hue. Refiring at a particular temperature will produce a color similar to that produced if the body were originally ion exchange fired at that temperature. Furthermore, there may be a slight difference in hue or saturation. The length of time necessary to affect the color change by refiring is usually shorter than that necessary if the body were originally ion exchange fired at that same temperature. Moreover, there can be as many refirings as desired provided that the refire to produce a color change is at a temperature higher than the highest prior firing and also between 500° C. and 850° C.

The unique feature of this aspect of our invention is that once a color has been produced it can be changed. In glasses it is known to change color by refiring in an oxidizing or reducing atmosphere so as to change the oxidation state of the stain-coloring ion. However, in glasses if there is no change in oxidation state, there will only be a change in hue, or saturation, and not in color. In the glass-ceramics, there is not believed to be any change in oxidation state upon refiring. It is believed that the metal coloring atoms diffuse thereby changing the size of the color center and hence the color.

The same staining paste compositions used to produce stain coloring can yield color changes upon refiring provided the paste contains copper and silver ions. In order to produce the most desirable and uniform coloring, the paste should contain, in weight percent of total dry solids, between 20% and 35% silver and 1.5% and 12% copper. Pastes having less than the minimum copper and/or silver may be used but will produce non-uniform colors. On the other hand, if more than the maximum copper and/or silver is used, a metal film will form on the surface. This film traps the alkali ion, leaving the glass-ceramic, at the metal/glass-ceramic interface. The trapped alkali ion may then attack the glass-ceramic surface, re-exchange with the coloring metal ion or produce other undesirable results. However, when the film is removed the glass-ceramic has been found to have been stain-colored and to have changed colors upon refiring.

Seven samples having a dark bronze stain, were prepared as in Example III. Each sample was then refired at a higher temperature than the 575° C. ion exchange firing schedule and produced a different color. The results are tabulated below:

| Example No. | Refire schedule | Color |
|---|---|---|
| XXI | 610° C. for 20 minutes | Medium bronze. |
| XXII | 640° C. for 15 minutes | Light bronze. |
| XXIII | 670° C. for 15 minutes | Bronze green. |
| XXIV | 700° C. for 15 minutes | Bronze gold. |
| XXV | 730° C. for 15 minutes | Golden brown. |
| XXVI | 800° C. for 15 minutes | Caramel. |
| XXVII | 850° C. for 15 minutes | Mustard. |

These samples could have been fired for longer periods of time but there would have been little, if any, further color change. Any sample could be refired as many times as desired so as to affect a color change, provided that the refiring temperature meets the aforementioned limitations. Regardless of the number of refirings, the color produced at the highest refiring temperature will be similar to the color produced if the body were originally ion exchange fired at that temperature. Furthermore, the sequence of refiring is not critical. For example, a sample could be ion exchange fired, cooled (perhaps to the ambient temperature), then refired at a temperature higher than the ion exchange temperature and affect a color change. On the other hand, there need be no cooling and the body could be refired immediately after ion exchange firing. We have found that the refiring time may vary somewhat depending upon the ion exchange firing temperature and the refiring temperature. The similarity between the colors produced in Examples XII through XVI and XXI through XXVII should be noted.

Seven matte finished samples were prepared as in Example VIII. These samples were then refired as indicated below with the resultant color changes.

| Examples | Firing schedule | Color |
|---|---|---|
| XXVIII | 610° C. for 20 minutes | Slate gray. |
| XXIX | 640° C. for 15 minutes | Quail gray. |
| XXX | 670° C. for 15 minutes | Sage. |
| XXXI | 700° C. for 15 minutes | Taupe. |
| XXXII | 730° C. for 15 minutes | Dark sand. |
| XXXIII | 800° C. for 15 minutes | Mocka tan. |
| XXXIV | 850° C. for 15 minutes | Butterscotch. |

An additional seven samples were prepared as in Example VI wherein the ceramming schedule was 950° C. for ½ hour, which resulted in a gray-blue color. These samples were then refired as indicated below with the resultant color changes:

| Examples | Firing schedule | Color |
|---|---|---|
| XXXV | 600° C. for 20 minutes | Medium blue. |
| XXXVI | 620° C. for 15 minutes | Navy gray. |
| XXXVII | 640° C. for 15 minutes | Sky gray. |
| XXXVIII | 660° C. for 15 minutes | Mauve gray. |
| XXXIX | 700° C. for 15 minutes | Sand stone. |
| XXXX | 750° C. for 15 minutes | Sand. |
| XLI | 850° C. for 15 minutes | Spice beige. |

Example XLII

A sheet of glass-ceramic was treated as in Example VIII except that it was cerammed at 950° C. for ½ hour. The resultant matte finished sheet had a blue color.

Five samples were then prepared as in Example XLII and then refired as indicated below with the resultant color changes:

| Examples | Refire schedule | Color |
|---|---|---|
| XLIII | 620° C. for 20 minutes | Medium blue. |
| XLIV | 650° C. for 20 minutes | Slate. |
| XLV | 700° C. for 20 minutes | Gray. |
| XLVI | 750° C. for 20 minutes | Rose beige. |
| XLVII | 850° C. for 20 minutes | Peach. |

We claim:
1. A method for stain-coloring an alkali metal-containing glass-ceramic article formed by ceramming a glass article at a temperature between 850°–1200° C. which comprises:
  (a) coating a surface of the glass-ceramic article with a staining paste consisting essentially of
    (1) at least one metal coloring ion selected from the group consising of copper, gold, mercury, silver, and thallium;
    (2) at least one diluent selected from the group consisting of $Al_2O_3$, $TiO_2$, and $ZrO_2$;
    (3) a plasticizer; and a
    (4) wetting agent; and, thereafter,
  (b) heating the coated glass-ceramic article to a temperature between about 500°–850° C. for a time sufficient to cause the ion exchange of alkali metal ions for metal coloring ions in the microcrystalline structure under sufficient reducing conditions to reduce the metal coloring ions to metal atoms.

2. A method according to claim 1 wherein said coating of staining paste is between about 0.0025″–0.0045″ thick.

3. A method according to claim 1 wherein said diluent comprises in weight percent of dry solids, about 20–80% of the staining paste.

4. A method according to claim 1 wherein thallium constitutes the metal coloring ion and the ion exchanged article is heated to about 500°–850° C. under reducing conditions for a time sufficient to cause the reduction of thallium ions to color producing thallium atoms.

5. A method according to claim 1 wherein copper and silver constitute the meal coloring ions and the ion exchanged article is heated to a temperature between about 500°–850° C. which is higher than the highest prior firing temperature for a time sufficient to effect a color change.

6. A method according to claim 5 wherein the copper metal coloring ion comprises, in weight percent of dry solids, about 1.5–12% of the staining paste and the silver metal coloring ion comprises, in weight percent of dry solids, about 20–35% of the staining paste.

7. A stain-colored, alkali metal-containing glass-ceramic made in accordance with the method of claim 1.

References Cited

UNITED STATES PATENTS

| 2,075,446 | 3/1937 | Leibig | 65—60 |
| 2,701,215 | 2/1955 | Kroeck | 65—30 XR |
| 2,732,298 | 1/1956 | Stookey | 65—30 XR |
| 3,000,761 | 9/1961 | Levi | 65—30 XR |
| 3,266,912 | 8/1966 | Murphy | 65—30 XR |
| 3,313,644 | 4/1967 | Morrissey | 65—30 XR |
| 3,429,742 | 2/1969 | Grego et al. | 65—30 XR |

S. LEON BASHORE, Primary Examiner

J. H. HARMAN, Assistant Examiner

U.S. Cl. X.R.

65—30, 33, 60; 106—39